United States Patent [19]
Oosterling et al.

[11] Patent Number: 5,245,947
[45] Date of Patent: Sep. 21, 1993

[54] MILKING CUP AND A MILKING SET PROVIDED WITH ONE OR MORE SUCH MILKING CUPS AND AN AUTOMATIC MILKING APPARATUS

[75] Inventors: Pieter A. Oosterling, Nieuw Vennep; Marinus H. Weststrate, Lisse, both of Netherlands

[73] Assignee: Prolion B.V., Vijfhuizen, Netherlands

[21] Appl. No.: 884,062

[22] Filed: May 15, 1992

[30] Foreign Application Priority Data

May 17, 1991 [NL] Netherlands ............... 9100870
Jan. 13, 1992 [NL] Netherlands ............... 9200051

[51] Int. Cl.⁵ .............................................. A01J 5/06
[52] U.S. Cl. ........................................... 119/14.48
[58] Field of Search ............... 119/14.47, 14.48, 14.49, 119/14.5, 14.51, 14.52, 14.53

[56] References Cited

U.S. PATENT DOCUMENTS

| 2,334,481 | 11/1943 | Da Silveira | 119/14.47 |
| 3,176,654 | 4/1965 | Morrison et al. | 119/14.01 |
| 4,223,635 | 9/1980 | Akerman | 119/14.5 X |

FOREIGN PATENT DOCUMENTS

| 65570 | 8/1975 | Australia. |
| 0347004 | 12/1989 | European Pat. Off. . |
| 32358 | 3/1934 | Netherlands. |
| WO9007268 | 7/1990 | World Int. Prop. O. . |

OTHER PUBLICATIONS

V. Parenti Castelli, G. Vassura; la pneumatica nell-'automazione delle operazioni di mungitura.

*Primary Examiner*—Robert P. Swiatek
*Attorney, Agent, or Firm*—Webb, Burden, Ziesenheim & Webb

[57] ABSTRACT

A milking cup comprising a flexible member provided with an opening for a teat on the top part thereof and pulling mechanism which is movable from a rest position in order to exert a pulling force on the flexible member for the purpose of enlarging the opening therein, wherein the flexible member is fixed to the pulling means, such that the pulling force engages at least partly evenly along the periphery of the flexible member.

19 Claims, 3 Drawing Sheets

MILKING CUP AND A MILKING SET PROVIDED WITH ONE OR MORE SUCH MILKING CUPS AND AN AUTOMATIC MILKING APPARATUS

BACKGROUND OF THE INVENTION

Especially for automatic milking apparatus it is advantageous if the opening of a milking cup can be widened when applying the cup.

Known from EP-A-347004, FIG. 1 thereof, is a milking cup with a variable diameter for a teat of, for instance, a cow, which is of particular importance with devices for automatic arranging of such milking cups, since it is easier to place the teat in an opening of greater diameter. During milking, a good seal from the outside environment of the vacuum to be generated in the inner space of the milking cup has to be ensured. This prior art cup has a rest position in which the opening is wide, and a force is exerted to a ring which clamps onto the teat and provides sealing from the outside environment. Such clamping is however undesirable, as this discomforts the animal. Further, it is to be expected that the ring will not be circular in its wide position, which is also undesirable.

In FIG. 2, 3 from EP-A-347004 a teat catcher having a narrow rest position is shown. This teat catcher is however operated by means of cables. The attachment of cables to the rubbery material is very difficult: the rubbery material will have to be reinforced and/or the rubbery material will not endure the forces from the cables. Further, cables from different cups of a milking set will interfere with one another.

SUMMARY OF THE INVENTION

The present invention provides a milking cup comprising a flexible member provided with an opening for a teat on the top part thereof and pulling means which are movable from a rest position in order to exert a pulling force on the flexible member for the purpose of enlarging the opening therein, wherein the flexible member is fixed to the pulling means, such that the pulling force engages at least partly evenly along the periphery of the flexible member. The flexible member is therefore loaded as evenly as possible, such that it can be thin and very flexible.

As the flexible member extends on the upper part of the milking cup the pulling means can be disposed outside the outer wall of the milking cup, which considerably simplifies the construction of the milking cup according to the present invention.

A preferred embodiment of the milking cup according to the present invention is provided with a flexible member of rubbery material which can move along a guide member.

The pulling means can exert a force on the flexible member mechanically but preferably the force is generated pneumatically (or hydraulically) as pneumatic (or hydraulic) means are often present in a milking area, are reliable in operation and/or are less subject to contamination.

BRIEF DESCRIPTION OF THE DRAWINGS

Further advantages, features and details of the present invention will be elucidated in the light of a description of a preferred embodiment with reference to the annexed drawing, in which.

DESCRIPTION OF THE PREFERRED EMBODIMENTS

Figure 1:
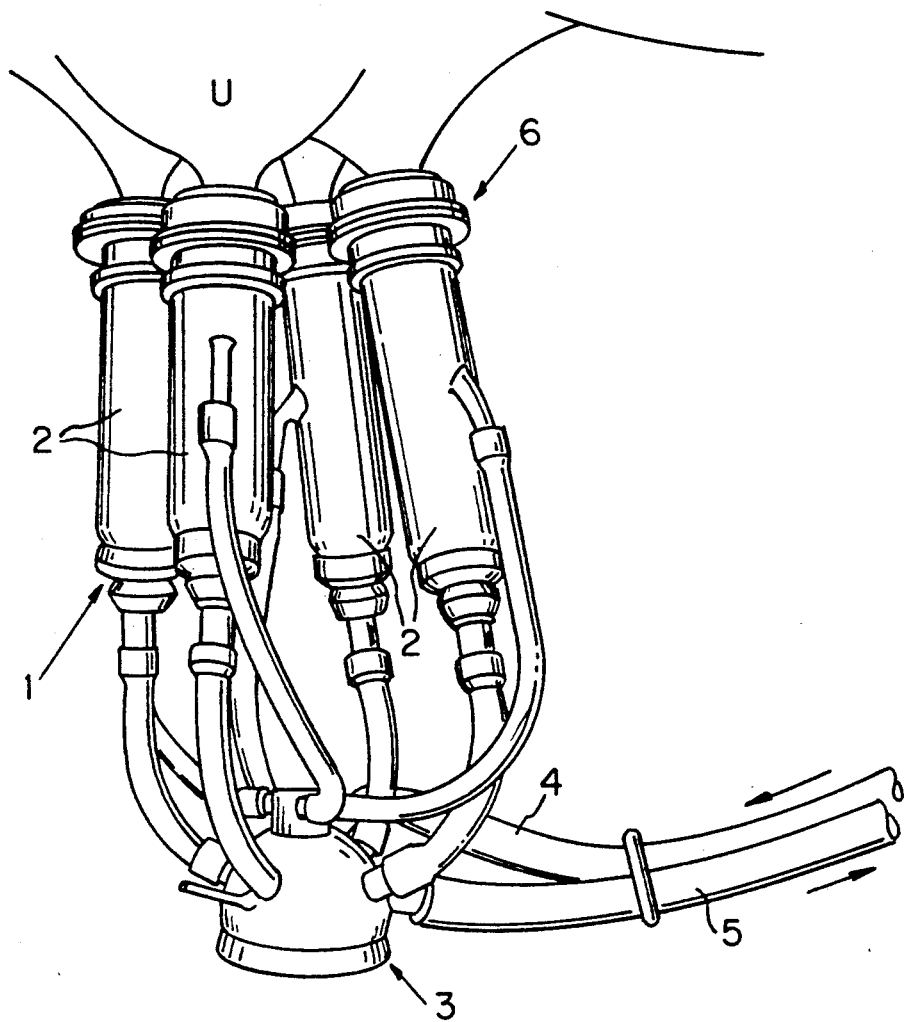
FIG. 1 shows a view in perspective of four preferred embodiments of milking cups according to the present invention arranged around teats.

A milking set 1 (FIG. 1) comprises four milking cups 2 which are arranged or fitted on teats of an udder U and which are coupled via a distributor piece 3 to a conduit 4 for generating pressure pulses and a drain conduit 5 for carrying off milk. The milking cups 2 are provided on the upper part with downward movable pulling means 6 which can be operated mechanically, pneumatically or hydraulically, or even manually.

Figure 2A:
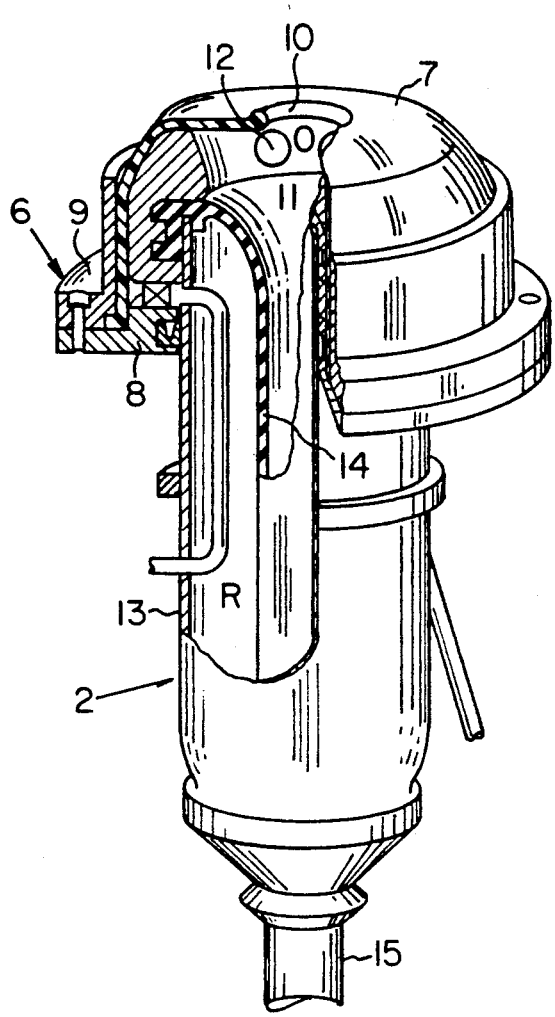
FIG. 2A and 2B show views in perspective of a second preferred embodiment of a milking cup of FIG. 1 in a first and second position respectively.
Figure 2B:
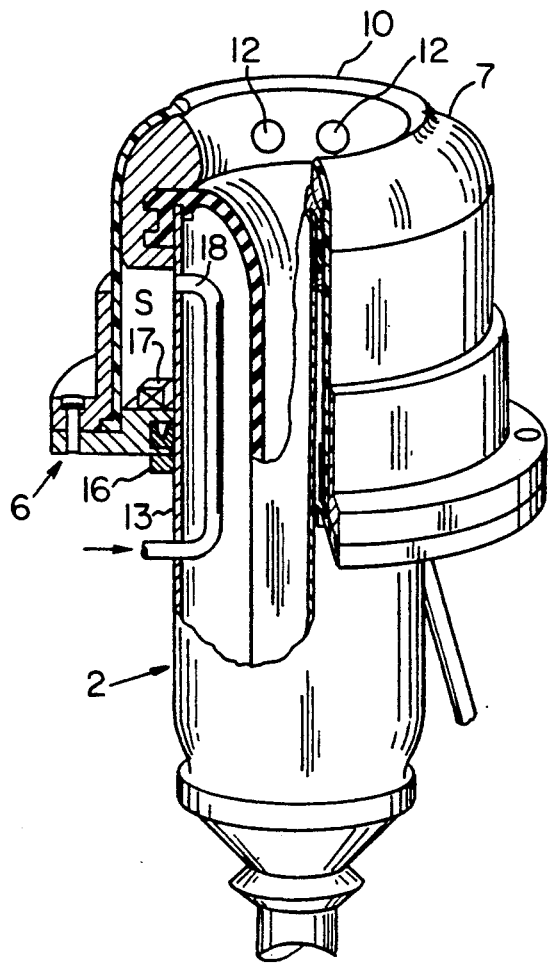

As can be seen in FIG. 2A and 2B, a flexible member 7 is arranged on the top of a milking cup 2, which member is fixed to the pulling means 6 between a lower ring part 8 and an upper ring part 9. The flexible member 7 preferably consists of rubbery material of small thickness, while the opening O therein for a teat, the teat being not shown in FIG. 2A and 2B, is enclosed by an annular portion 10 of slightly greater thickness.

The present invention is not restricted to the embodiment shown, wherein the annular portion 10 has a slightly greater thickness. In accordance with the locally desired properties of the flexible member it can be adapted locally in respect of hardness properties, resilience etc., for instance by means of the manner of vulcanization at that location.

The flexible member 7 is arranged over an annular guide member 11. The materials of the guide member 11 on the one hand and the flexible member on the other are preferably chosen such that they can slide easily over one another. One of the two may thus be made of Teflon TM and the other of, for instance, rubbery material.

In addition, schematically depicted sensors 12 are preferably arranged in the guide member 11, for instance to sense the presence or absence of a teat.

During milking the milking cup will be situated in the position shown in FIG. 2A, wherein the opening O in the flexible member 7 seals round a teat, while as a result of pressure pulses in the annular space R between a stiff outer wall 13 and a flexible inner wall 14 a milking movement is performed on the teat, while the milk is carried away via a hose 15. Since the space directly beneath the opening O is slightly wider than the cylindrical space as defined by the flexible wall 14 and located further downward, a so-called vacuum buffer is created in the upper part of the milking cup, which considerably reduces the chance of the milking cup falling off the teat.

When the milking cup 2 is placed around a teat it is brought into the position shown in FIG. 2B, preferably by bringing under pressure via line 18 an annular space S on the outside of the stiff wall 13. When the space S is brought under pressure the pulling means 6 are moved downward and thus exert a pulling force on the flexible member 7, wherein a considerably larger opening for introduction of a teat is enclosed by the rim 10. The movement of the pulling means 6 are preferably bounded by stops 16 and 17. The diameter of the opening is, for instance, variable between 18 and 45 mm. When pressure is removed in the space S the flexible member is once again returned by its resilience to the position shown in FIG. 2A.

The guide member 11 preferably has the form of a truncated cone or sphere so as to prevent folds forming in the flexible member 7.

Figure 3:
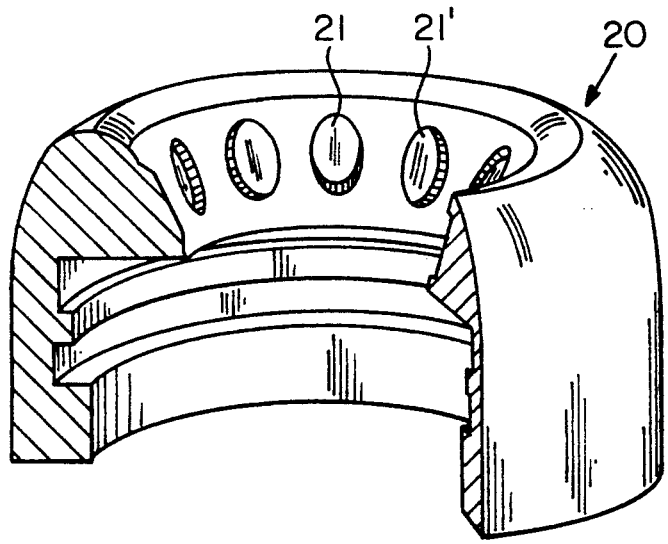
FIG. 3 is a view in perspective of a second embodiment of a guide member for a milking cup according to the present invention.

Shown in FIG. 3 is an embodiment of a guide member 20 that is provided with recesses 21 between partitions 21', which prevents a teat adhering to the guide member when it is inserted and possibly being folded double. Many variations are possible within the scope of the above embodiment. It will, for instance, be apparent that the ring parts 8, 9 (FIGS. 2A, 2B) protruding slightly from the milking cup may cause problems in practice in that different milking cups in a milking set may hook together. Another fixing of the bottom end of the flexible member can therefore be recommended.

Figure 4:
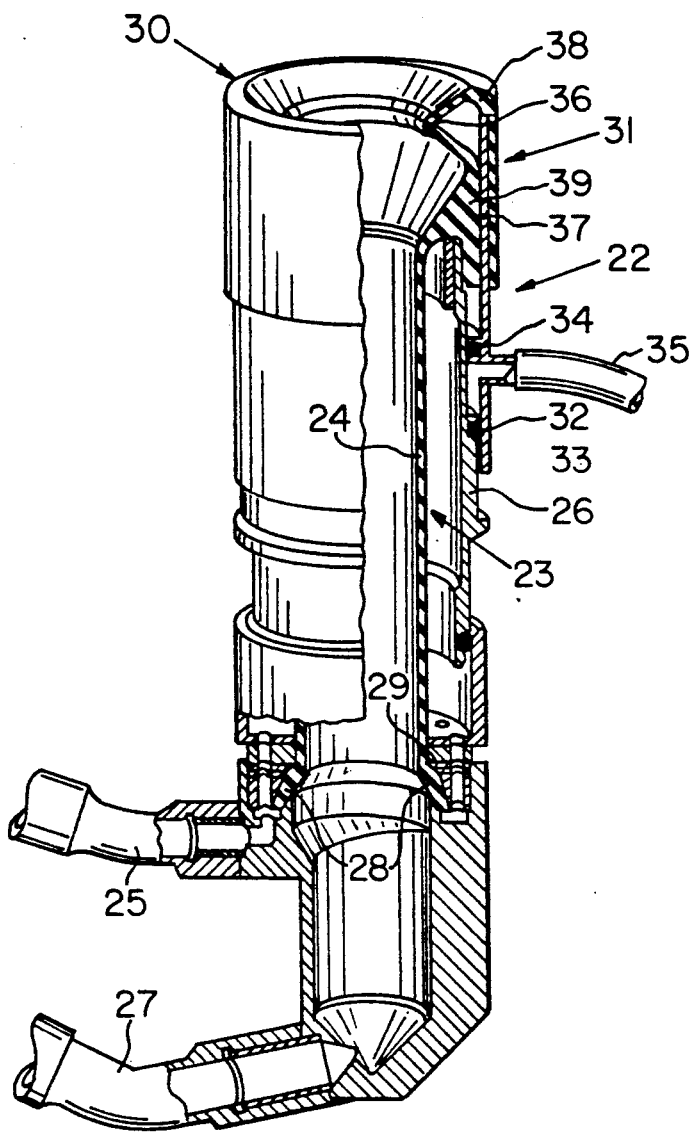
FIG. 4 is a side view partly broken away of a further preferred embodiment of the cup according to the present invention.
Figure 5:
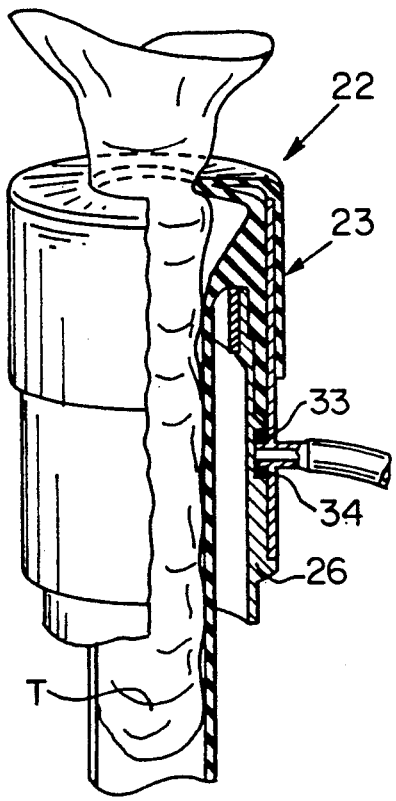
FIG. 5 is a view of the cup of FIG. 4 in a second position.

A further embodiment of a milking cup 22 (FIGS. 4, 5) is provided with a unitary part 23 of rubber material which forms the inner wall or lining 24 for exerting a milking movement to the teat T of a cow, and also forming a flexible member at the upper part of the cup and provided with the opening for the teat. The pulsating underpressure for milking is provided through line 25 between the lining 24 and an outer casing 26 of the cup. Milk (and cleaning water) is sucked off through line 27. Unitary member 23 is provided with a shoulder 28 that fits under a bracket 29. The unitary member or part 23 is provided with an upper part 30 in which the opening for a teat is included.

In rest position (FIG. 5) the cup 22 shows an opening of normal size which fits nicely around the teat in customary fashion, without exerting any additional force on the teat.

When applying the cup the opening is widened by exerting a pulling force to an outer circumferential flange 31 of the rubber part 23. In the shown preferred embodiment an annular space 32 is provided around outer casing 26, which space is sealed by rings 33, 34 and into which a line 35 debouches. When medium is pressurized into space 32 a sleeve 37 is moved in upward direction together with the flange 31. Thereby the opening is widened as ring shaped hinge 36 is moved in outwardly radial direction. This hinge 36 is preferably formed by a thinned portion of the rubber material.

Preferably parts 38 and/or 39 are reinforced or stiffened e.g. by embedding rings into unitary part 23, such that starting from those parts 38, 39 a force urges ring shaped hinge 36 in outward direction, thereby widening the upper opening in an even, circular way. The above may very well be accomplished by correctly dimensioning parts 36 and 37, 38 respectively.

The embodiments shown and described have a number of advantages:
- the inner construction of the cups remain basically unchanged; pulling means are provided outside the cup itself
- the inner construction remain very compact, meaning that it is prevented that cups form a milking set which interfere with each other
- the inventive cups require very few new parts, such that they are cost effective.

The rights applied for are defined by the annexed claims.

We claim:

1. A milking cup comprising a flexible member provided with an opening for a teat on the top part thereof and pulling means which are movable from a rest position in order to exert a pulling force on the flexible member for the purpose of enlarging the opening therein, wherein the flexible member is fixed to said pulling means between a rigid lower ring and a rigid upper ring, wherein said upper and lower rings are adapted to move along an outer wall of said milking cup such that the pulling force engages substantially evenly along the periphery of said flexible member.

2. A milking cup as claimed in claim 1, wherein the flexible member consists of elastic material, for instance rubbery material, of comparatively small thickness.

3. A milking cup as claimed in claim 2, wherein the flexible member is combined with a flexible inner wall of said cup to form a unitary part.

4. A milking cup as claimed in claim 2, further including a sensor means provided in the upper part of said milking cup for sensing the presence of a teat.

5. A milking cup as claimed in claim 2, further provided with a guide member along which said flexible member is movable.

6. A milking cup as claimed in claim 5, wherein said guide member and said flexible member are made of a material such that they can slide easily along one another.

7. A milking cup as claimed in claim 6, wherein one or more sensors are arranged in said guide member.

8. A milking cup as claimed in claim 2, wherein said pulling means are provided with an annular space around a wall part of said cup which is sealed relative to the outside environment, and into which said annular space debouches a line for a medium, with which said medium said annular space can be enlarged, thus exerting the pulling force on said flexible member.

9. A milking cup as claimed in claim 1, wherein the flexible member is combined with a flexible inner wall of said cup into a unitary part.

10. A milking cup according to claim 9, provided with a ring shaped hinge which moves in an outward direction when the pulling force is exerted by said pulling means.

11. A milking cup as claimed in claim 9, wherein said pulling means are provided with an annular space around a wall part of said cup which is sealed relative to the outside environment, and into which said annular space debouches a line for a medium, with which said medium said annular space can be enlarged, thus exerting the pulling force on said flexible member.

12. A milking cup as claimed in claim 1, provided with sensor means for sensing the presence of a teat and provided in the upper part of said milking cup.

13. A milking cup as claimed in claim 1, wherein the pulling means are provided with an annular space around a wall part of the cup sealed relative to the outside environment, into which annular space debouches a line for medium, with which medium the annular space can be enlarged, thus exerting the pulling force on the flexible member.

14. A milking cup comprising a flexible member provided with an opening for a teat on the top part thereof and a pulling means which are movable from a rest position in order to exert a pulling force on the flexible member for the purpose of enlarging the opening therein, wherein the flexible member is fixed to said pulling means, such that the pulling force engages at least partly evenly along the periphery of said flexible member, further provided with a guide member along which the flexible member is movable.

15. A milking cup as claimed in claim 14, wherein the guide member and the flexible member are made of material such that they can move or slide easily along one another.

16. A milking cup as claimed in claim 14, wherein one or more sensors are arranged in the guide member.

17. A milking set provided with one or more cups, wherein each milking cup comprises a flexible member provided with an opening for a teat on the top part thereof and pulling means which are movable from a rest position in order to exert a pulling force on the flexible member for the purpose of enlarging the opening therein, wherein the flexible member is fixed to said pulling means, such that the pulling force engages at least partly evenly along the periphery of said flexible member, further provided with a guide member along which the flexible member is movable.

18. An apparatus for automatically fitting around one or more teats comprising at least one cup wherein said at least one cup includes a flexible member provided with an opening for a teat on the top part thereof and pulling means which are movable from a rest position in order to exert a pulling force on the flexible member for the purpose of enlarging the opening therein, wherein the flexible member is fixed to said pulling means between a rigid lower ring and a rigid upper ring, wherein said upper and lower rings are adapted to move along an outer wall of said at least one cup such that the pulling force engages substantially evenly along the periphery of said flexible member.

19. A milking cup comprising a flexible member provided with an opening for a teat on the top part thereof and a pulling means which are movable from a rest position in order to exert a pulling force on the flexible member for the purpose of enlarging the opening therein, wherein the flexible member is fixed to said pulling means, such that the pulling force engages at least partly evenly along the periphery of said flexible member, further including a ring shaped hinge which moves in an outward direction when the pulling force is exerted by said pulling means.

* * * * *